United States Patent [19]

Mogilevsky et al.

[11] 3,917,994
[45] Nov. 4, 1975

[54] OSCILLOGRAPHIC FERROMETER

[76] Inventors: Vitaly Moritsovich Mogilevsky, ulitsa O. Zhilinoi 92-b; Vadim Petrovich Ekimov, ulitsa Schetinkina, 48, kv. 33; Eduard Alexeevich Abrosimov, Natymskaya, 9, kv. 44, all of Novosibirsk, U.S.S.R.

[22] Filed: Oct. 10, 1974

[21] Appl. No.: 513,943

[52] U.S. Cl. .............................................. 324/34 R
[51] Int. Cl.[2] .................................... G01R 33/12
[58] Field of Search ..................... 324/34 R, 34 PE

[56] References Cited
UNITED STATES PATENTS

| | | | |
|---|---|---|---|
| 3,358,224 | 12/1967 | Mogilevsky et al. | 324/34 R |
| 3,500,180 | 3/1970 | Mogilevsky | 324/34 R |

*Primary Examiner*—Robert J. Corcoran
*Attorney, Agent, or Firm*—Waters, Schwartz & Nissen

[57] ABSTRACT

An oscillographic ferrometer comprising a magnetizing device, magnetization and magnetizing field measurement channels and a storage means connected to a magnetization measurement channel switch and including a magnetic drum carrying a preset signal record representing the standard sample magnetization. The magnetic drum is coupled with a synchronous motor whose supply voltage frequency is of the same value as that of the magnetizing device. Two reproduce magnetic heads are accommodated in the magnetic drum housing diametrically opposite each other and connected to an adder input, one head being connected directly and the other via a signal level regulator. The adder output is connected to said switch.

4 Claims, 1 Drawing Figure

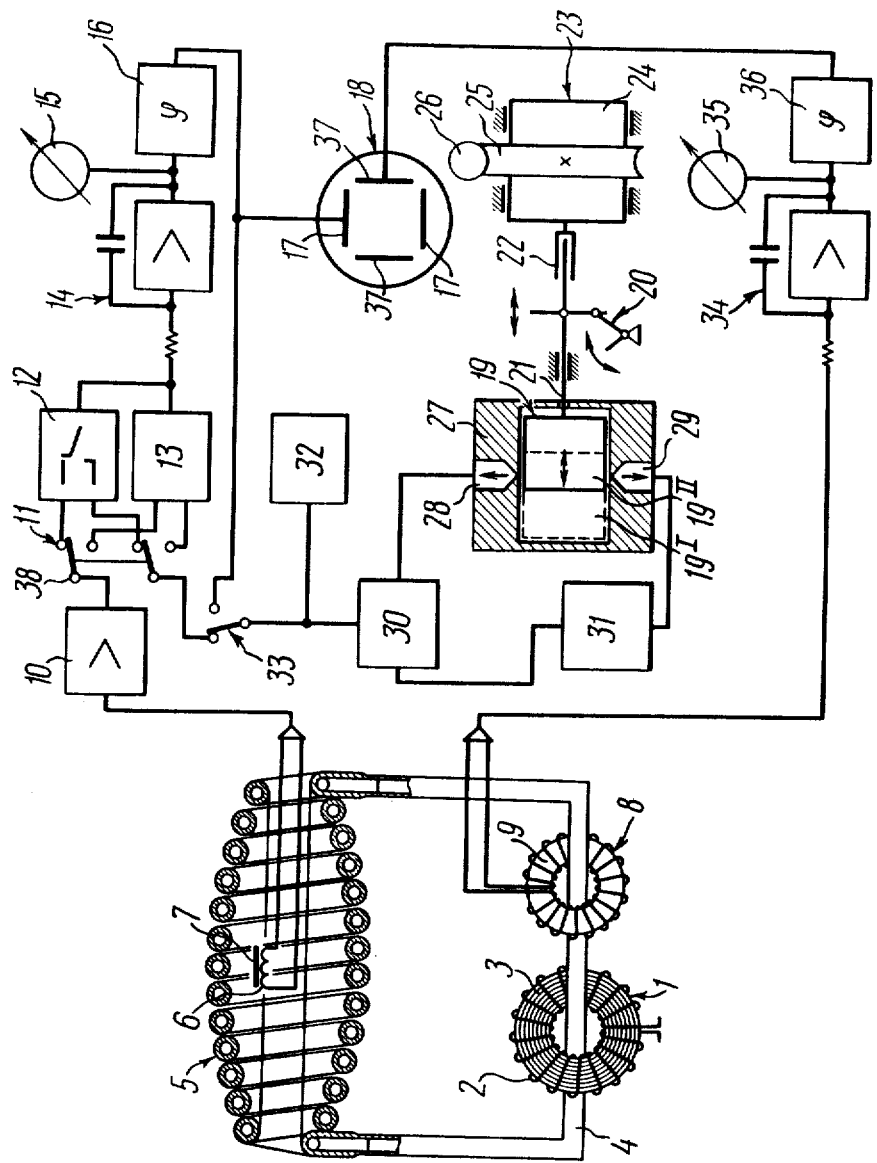

OSCILLOGRAPHIC FERROMETER

The present invention relates to rapid magnetic testing of ferromagnetic samples and articles, and more specifically, to oscillographic ferrometers.

The present invention may find application in the metallurgical, electronic and radio engineering industries for measuring dynamic hysteresis loop parameters of samples or articles being manufactured.

Known in the art is an oscillographic ferrometer wherein the hysteresis loop parameters of the test sample are compared with the preset signals representing the hysteresis loop parameters of a standard sample or article.

This prior art oscillographic ferrometer comprises a magnetizing means, a magnetization measurement channel having a standard sample and a test sample magnetization pick-up means and a magnetizing field measurement channel having a field strength pick-up means. The magnetizing means includes a step-down transformer having a single-turn secondary winding connected to a solenoid capable of producing a homogeneous magnetic field. The magnetization measurement channel pick-up units are connected, via the contracts of a switching means, to the input of the magnetization measurement channel comprising an integrator, a phase corrector and a computing means connected in series therewith, the output of said computing means being connected to a cathode-ray tube. The field strength pick-up unit is connected to a second integrator whose output is connected to the cathode-ray tube via a phase corrector.

The disadvantage of the prior art ferrometer is that it employs an approved ferromagnetic sample as a standard whose properties vary with time and depend on the environmental factors (such as ambient temperature, penetrating radiation, etc.), thus reducing the accuracy of measurements.

Another disadvantage of the prior art ferrometer resides in that both the test and standard samples should be placed into the magnetic field of the magnetizing means together with the two respective measuring coils. This results in an almost two-fold reduction of the solenoid useful bore diameter, and a corresponding increase in the solenoid outside diameter with the same magnetizing force ($H_m$ = const), according to Fabry's law, will require a quadratic enhancement of the power, which makes the ferrometer a much higher power consuming instrument when used for strong field tests.

It is an object of the present invention to provide an oscillographic ferrometer having an improved accuracy of magnetic measurements using the method of comparison with a standard sample.

Another object of the present invention is to provide a ferrometer having a lower specific power consumption by the magnetizing means.

Yet another object of the present invention is to provide an oscillographic ferrometer providing for standard test-sampling methods used in the production of ferromagnetic articles in various industries.

These and other objects of the invention are achieved in an oscillographic ferrometer for comparing signals representative of the test sample hysteresis loop parameters with preset signals representing the standard sample characteristics, comprising a magnetizing means including a stepdown transformer having a single-turn secondary winding connected to a solenoid capable of producing a homogeneous magnetic field, a magnetization measurement channel having a magnetization pick-up means connected via a switch to a switching means and a differential amplifier, said switching means and said differential amplifier having their outputs connected to an integrator coupled to a cathode-ray tube via a phase corrector, a magnetizing field measurement channel having a field strength pick-up means connected to the input of a second integrator having its output connected to the cathode-ray tube via a second phase corrector, according to the invention, further comprising a storage means connected to a switch and including a magnetic drum carrying a record of the preset signal representing the standard sample magnetization characteristics and coupled to a synchronous electric motor whose supply voltage frequency is of the same value as that of the magnetizing means, said magnetic drum having two reproduce magnetic heads accommodated in a housing thereof, each being connected one directly and the other via a signal level regulator to an input of an adder, the output of said adder being connected to the switch of said magnetization measurement channel.

This solution is very advantageous, since it provides for a higher accuracy of comparing the pick-up signal with the signal representative of the standard sample characteristics recorded on the magnetic drum.

Each of the magnetic heads may be mounted at the magnetic drum surface with the working gap being defined by the relation $$a \leq \lambda \xi \pi$$

where $\lambda$ is the wavelength of the preset signal recorded on the drum;

$\xi$ is the allowable non-linearity of the record remnant flux decay.

However, the variation of the gap between the magnetic drum medium and a reproduce head even in the order of 1 micron characteristic of an air-lubricated drum, gives an up to 10% signal amplitude oscillation during the reproduce or play-back process.

This undesirable feature is eliminated by providing two reproduce heads in the memory device arranged diametrically opposite each other so that the signal amplitude oscillations caused by the drum radial beat are in antiphase and they can be compensated for by means of an adder which receives the signals from both reproduce heads.

It is expedient to use a dual-track magnetic drum having a track switch wherein the second track is used for recording a clock sinusoidal signal. The adder has its inputs connected to both magnetic reproduce heads and its output is connected to the signal constant component null indicator.

Thus, in addition to improving the magnetizing means use factor, such advantageous features of magnetic recording as wide frequency range, possibility of repeated reproducing and copying the record, make feasible the standardization of the test-sampling methods in various industries by way of supplying the manufacturers on a centralized basis with standard sample magnetic records.

It is also expedient to provide the oscillographic ferrometer with a second switch at the adder output so that it is connected to the first switch and connects the adder output to the vertical deflection plates of the oscillographic unit cathode-ray tube, and mount the synchronous electric motor frame in the storage means so that the whole electric motor assembly can be smoothly rotated about its axis by a slewing mechanism and stopped after the rotation.

The oscillographic ferrometer of the present invention provides for:

1. improving the accuracy of magnetic measurements using the method of comparison with the standard sample, due to reducing the environmental effects (ambient temperature, penetrating radiation, ageing processes, etc.);
2. standardization of test-sampling methods in the production of ferromagnetic articles in various industries by using duplicated standard sample signal records which, due to their higher stability and better immunity to environmental effects, ensure better reproducibility than the standard samples themselves while rendering the metrological services cheaper;
3. reducing the specific power consumption by the magnetizing means, since the standard sample magnetization is no longer needed;
4. reduced errors caused by the dynamic variation of the distance between the record medium surface and the reproduce head working gap during the standard sample signal reproduce process.

Other objects and advantages of the present invention will become more apparent and the invention itself will be best understood by reference to the following description of an embodiment thereof taken in conjunction with the accompanying drawing which is a block diagram of an oscillographic ferrometer made in accordance with the present invention.

The oscillographic ferrometer comprises a magnetizing means, a magnetization measurement channel, a magnetizing field measurement channel and a storage means.

The magnetizing means includes a toroidal stepdown transformer 1 having a primary winding 2 arranged on a core 3 and a single-turn secondary winding 4 in the form of a hollow conductor.

The magnetizing means has a homogeneous magnetic field source in the form of a single-layer ellipsoidal solenoid 5 wound of a tubular conductor and connected across the secondary winding 4 of the toroidal transformer 1 having its primary winding 2 connected to a power supply (not shown).

A pick-up coil 6 is arranged inside the solenoid 5 for measuring the magnetization of a test ferromagnetic sample 7. A toroidal pick-up coil 8 is mounted on a frame 9 coaxially with the secondary winding 4 for measuring the field strength of the solenoid 5.

The pick-up coil 6 is connected to the input of a linear preamplifier 10 whose output is connected either to an input of an electronic switching means 12 or to one of the inputs of a differential amplifier 13 via a double-throw switch 11. The switching device 12 has its other input connected to the storage means via the switch 11. The output of the switching means is connected to the input of an integrator 14 whose output is connected to a calibrator 15 of the magnetization (J) channel and the input of a phase corrector 16 which has its output connected to vertical deflection plates 17 of a cathode-ray tube 18.

The memory device includes an air-lubricated dual-track magnetic drum which can be fixed in two axial positions 19' and 19'' by means of a drum track selector. As shown in the drawing, a link gear 20 coupled with a shaft 21 of the drum 19 may be used as a track selector. The shaft 21 is coupled with a synchronous electric motor 23 by means of a telescopic coupling 22. The synchronous electric motor 23 has a worm pair 25, 26 mounted coaxially with the shaft thereof on a frame 24 and used as a slewing mechanism for rotating the frame 24 of the electric motor 23 about its axis. The power supply frequency of the electric motor 23 equals the frequency of the magnetizing means power supply.

In a housing 27 of the magnetic drum 19, two reproduce magnetic heads 28 and 29 are accommodated diametrically opposite each other so that the distance between the medium surface of the drum 19 and the heads 28, 29 lies within the linear zone of the record remanent flux decay. This zone is determined as follows.

It is known that the record remanent flux decays according to the following law:

$$\frac{\phi_a}{\phi_o} = e^{-2\pi \frac{a}{\lambda}}$$

where
$a$ is the air gap between the magnetic medium and the head 28 (29);
$\lambda$ is the wavelength of the recorded signal. Expanding $\phi_a / \phi_o$ to a series with powers of $a/\lambda$ and confining ourselves to the third power terms because of the smallness of $a/\lambda$, we obtain:

$$\frac{\phi_a}{\phi_o} = 1 - 2\pi \frac{a}{\lambda} + 2\pi^2 \left(\frac{a}{\lambda}\right)^2 - \frac{4}{3}\pi^3 \left(\frac{a}{\lambda}\right)^3.$$

Taking an admissible ratio of the non-linear terms of the expression $\phi_a / \phi_o$ to the first power term to be $$\frac{\left| 2\pi^2 \left(\frac{a}{\lambda}\right)^2 - \frac{4}{3}\pi^3 \left(\frac{a}{\lambda}\right)^3 \right|}{\left| 2\pi \left(\frac{a}{\lambda}\right) \right|}$$

we can have an approximate solution which will relate the distance between the head and the magnetic medium to the recorded signal wavelength for which the linear law of the remanent flux dacay stands valid with a sufficient accuracy;

$$a/\lambda = \pi$$

The reproduce head 28 is connected to the first input of an adder 30 and the reproduce head 29 is connected to the second input of the adder 30 via a level regulator 31. The output of the adder 30 is connected to a constant component null indicator 32 as well as to the vertical deflection plates 17 of the cathode-ray tube 18 via a switch 33 or to the switch 11 whose contacts are connected to an input of the switching means 12 and the differential amplifier 13. The output of the pick-up coil 8 for measuring the solenoid field strength is connected to the input of an integrator 34 of the magnetizing field measurement channel which also includes a calibrator 35 and a phase corrector 36 whose output is fed to horizontal deflection plates 37 of the cathoderay tube 18.

The operation of the ferrometer is as follows.

A signal from the magnetization pick-up is fed via the preamplifier 10 and a contact 38 of the switch 11 to an input of the switching device 12 from whose output it goes to the integrator 14, the calibrator 15, the phase corrector 16 and the vertical deflection plates 17.

The other input of the switching means 12 is fed, via the switch 11, from the magnetic drum 19 with the signal being reproduced and representing the standard sample magnetization. This signal is used as a reference to compare the signal representing the test sample magnetization therewith.

The storage means operates in the following manner. One track of the magnetic drum 19 carries a record of the signal representing the magnetization J ($t$) of the standard sample and the other track carries a clock sinusoidal signal. The clock signal is equal to the magnetization frequency of the standard sample. The clock serves to balance the signals coming to the inputs of the adder 30 from the reproduce heads 28 and 29 and to adjust the phase coincidence of the standard sample signal with the test sample magnetizing field. For this purpose, prior to the measurement the magnetic drum 19 is set to a position 19$''$ at which the clock track is positioned in front of the reproduce heads 28 and 29.

From the reproduce heads 28 and 29 the signals having at each given moment oppositely signed amplitude variations caused by the radial beat of the drum 19 are fed to the inputs of the adder 30 having its output connected to the constant component null indicator 32. To make the signals of the reproduce heads 28 and 29 equal, the transmission factor of the level regulator is set for the minimum constant component as registered by the null indicator 32. Then the distortions resulting from the radial beat of the magnetic drum 19 will become minimum at the output of the adder 30. To balance the phases of the standard sample signal reproduced from the magnetic drum 19 and the test sample magnetizing field, the output of the adder 30 is connected to the vertical deflection plates 17 via the switch 33. The phase coincidence is achieved by rotating the electric motor 23 by means of a worm pair 25, 26 and mointoring the zero phase shift on the screen of the cathode-ray tube 18. The electric motor is fixed in a position corresponding to the zero phase shift of the signals.

After completing the amplitude balancing of the signals coming from the reproduce heads 28 and 29 and phasing the standard sample signal with the test sample magnetizing field, the output of the adder 30 is connected back to the input of the electronic switching device 12 or to the input of the differential amplifier 13 by means of the switch 11 and the magnetic drum 19 is returned to the position 19$'$. As a result, the cathode-ray tube 18 will display a combined pattern of the test sample magnetization or hysteresis loop and the standard sample magnetization signal recorded on the magnetic drum 19 or a differential loop characterizing the deviation of the test sample parameters from the standard ones at each point of the magnetization or hysteresis loop.

What is claimed is:

1. An oscillographic ferrometer comprising: a magnetizing means; a magnetization measurement channel cooperating with said magnetizing means; a magnetizing field measurement channel cooperating with said magnetizing means; a storage means connected to said measurement channels; said magnetizing means comprising: a step-down transformer, a single-turn secondary winding of said step-down transformer, a solenoid connected to said secondary winding and producing a homogeneous magnetic field in which a test sample is placed; said magnetization measurement channel comprising: a magnetization pick-up means arranged within the homogeneous magnetic field produced by said solenoid, a switch connected to said magnetization pick-up means, a switching means connected to said switch, a differential amplifier having inputs and an output, one input of said differential amplifier being connectded to said magnetization pick-up means, via said switch a first integrator connected to the output of said differential amplifier and to the output of said switching means, a first phase corrector seriesly connected to said first integrator; a cathode-ray tube connected to said first phase corrector; said magnetizing field measurement channel comprising: a field strength pick-up means inductively coupled with the field of the secondary winding, a second integrator having an input and an output, said input of said second integrator being connected to said field strength pick-up means, a second phase corrector having an input and an output, said input of said second phase corrector being connected to the output of said second integrator, said output of said phase corrector being connected to said cathode-ray tube; said storage means being connected to said switch and comprising: a magnetic drum carrying a record of the preset signal representing the standard sample magnetization, a housing of said magnetic drum, a synchronous electric motor rotating said magnetic drum and being fed with the supply voltage having the same frequency as that of said magnetizing means, a frame of said synchronous electric motor, a first reproduce magnetic head accommodated in said magnetic drum housing at a distance from said magnetic drum sufficient to reproduce the recorded signal, a second reproduce magnetic head accommodated in said magnetic drum housing at a distance from said magnetic drum sufficient for reproducing the recorded signal and diametrically opposite to said first magnetic head, an adder having two inputs and an output, said adder having its first input connected to said first magnetic head, a level regulator having an input and an output, said level regulator having its input connected to the second magnetic head and its output connected to the second input of said adder, said adder having its output connected to said magnetization measurement channel switch.

2. An oscillographic ferrometer as claimed in claim 1, wherein each said magnetic head is accommodated in said magnetic drum housing with a working gap between it and the surface of said magnetic drum determined by the relation $a \leq \lambda \xi \pi$, where a is the working gap, $\lambda$ is the wavelength of the signal recorded on said magnetic drum and $\xi$ is the allowable non-linearity of the record remnant flux dacay.

3. An oscillographic ferrometer as claimed in claim 1, comprising a second switch arranged at the output of said adder and connected to the first-named switch and to said cathode-ray tube; a slewing mechanism for rotating said synchronous electric motor about its axis; a frame of said synchronous electric motor mounted so that said synchronous electric motor itself can be rotated about its axis and stopped after the rotation.

4. An oscillographic ferrometer comprising: a magnetizing means; a magnetization measurement channel cooperating with said magnetizing means; a magnetizing field measurement channel cooperating with said magnetizing means; a storage means connected to said measurement channels; said magnetizing means including: a step-down transformer, a single-turn secondary winding of said step-down transformer, a solenoid connected to said secondary winding and producing a homogeneous magnetic field within which a test sample is placed, said magnetization measurement channel including: a magnetization pick-up means arranged within the homogeneous magnetic field produced by said solenoid, a switch connected to said magnetization pick-up means, a switching means connected to said switch, a differential amplifier having inputs and an output, one of said inputs of said differential amplifier being connected to said magnetization pick-up means via said switch, a first integrator connected to the output of said differential amplifier and to the output of said switching means, a first phase corrector serially connected to said first integrator; a cathode-ray tube connected to said first phase corrector; said magnetizing field measurement channel including: a field strength pick-up means inductively coupled with the field of the secondary winding, a second integrator having an input and an output, said second integrator having its input connected to said field strength pick-up means, a second phase corrector having an input and output, said second phase corrector having its input connected to the output of said second integrator, the output of said second phase corrector being connected to said cathode-ray tube; said storage means being connected to said switch and including a dual-track magnetic drum, one track of said magnetic drum being used for recording a preset signal representing the standard sample magnetization and the other track of said magnetic drum being used for recording a clock sinusoidal signal, a housing of said magnetic drum, a synchronous electric motor rotating said magnetic drum and being fed with the supply voltage whose frequency is the same as that of said magnetizing means, a frame of said synchronous electric motor, a first reproduce magnetic head accommodated in said magnetic drum housing at a distance from said magnetic drum sufficient for reproducing the recorded signal, a second reproduce magnetic head accommodated in said magnetic drum at a distance from said magnetic drum sufficient for reproducing the recorded signal and diametrically opposite to said first magnetic head, a track selector cooperating with said magnetic drum, an adder having two inputs and an output, first input of said adder being connected to said first magnetic head, a level regulator having an input and an output, said input of said level regulator being connected to said second magnetic head, said output of said level regulator is connected to the other input of said adder, said output of said adder being connected to said magnetization measurement channel switch.

* * * * *